United States Patent [19]

France et al.

[11] Patent Number: 5,401,289

[45] Date of Patent: *Mar. 28, 1995

[54] METHOD OF MAKING HALIDE FIBERS INCLUDING CASTING UNDER A REDUCED PRESSURE

[75] Inventors: Paul W. France; Steven F. Carter; John R. Williams, all of Suffolk, England

[73] Assignee: British Telecommunications public limited company, London, England

[ * ] Notice: The portion of the term of this patent subsequent to Aug. 2, 2011 has been disclaimed.

[21] Appl. No.: 206,408

[22] Filed: Mar. 7, 1994

Related U.S. Application Data

[62] Division of Ser. No. 983,854, Mar. 4, 1993, Pat. No. 5,334,222.

[30] Foreign Application Priority Data

Jul. 9, 1990 [GB] United Kingdom ............... 9015090

[51] Int. Cl.$^6$ ............... C03B 19/02; C03B 37/07; C03B 37/012
[52] U.S. Cl. ............................. 65/379; 65/389; 65/388; 65/404; 65/134.2; 65/32.5; 65/71; 65/137; 65/DIG. 16
[58] Field of Search ............... 65/3.11, 32.5, 47, 71, 65/134, 137, DIG. 15, DIG. 16, 388, 404, 134.2, 379, 384

[56] References Cited

U.S. PATENT DOCUMENTS

| | | | |
|---|---|---|---|
| 3,429,684 | 2/1969 | Plumat | 65/137 |
| 4,195,982 | 4/1980 | Coucoulas | 65/134 |
| 4,659,355 | 4/1987 | Maze et al. | |
| 4,729,777 | 3/1988 | Mimura | 65/29 |
| 4,826,954 | 5/1989 | Suzuki et al. | |
| 4,835,235 | 5/1989 | DeMartino et al. | |
| 4,842,627 | 6/1989 | Schneider | 65/47 |
| 4,885,019 | 12/1989 | Hutta | |
| 4,897,100 | 1/1990 | Nice | |
| 4,913,836 | 4/1990 | East | |
| 4,925,475 | 5/1990 | Mimura | 65/23 |
| 4,946,490 | 8/1990 | Hall | 65/134 |
| 4,954,288 | 9/1990 | East | |
| 4,970,120 | 11/1990 | Laschewsky et al. | |
| 5,034,277 | 7/1991 | Laschewsky et al. | |
| 5,055,120 | 10/1991 | Tran | 65/71 |

FOREIGN PATENT DOCUMENTS

| | | |
|---|---|---|
| 0161999 | 11/1985 | European Pat. Off. |
| 0170380 | 2/1986 | European Pat. Off. |
| 0336280 | 10/1989 | European Pat. Off. |
| 86/07587 | 12/1986 | WIPO |

OTHER PUBLICATIONS

Patent Abstracts of Japan, vol. 12, No. 410, 28 Oct. 1988, & JP A 63147838 (Nippon Telegr. & Teleph. Corp.) 20 Jun. 1988.

Patent Abstracts of Japan, vol. 14, No. 184, 13 Apr. 1990, & JP A 2030635 (Sumitomo Electric Ind. Ltd.) 1 Feb. 1990.

Chemical Abstracts, vol. 102, No. 24, 1985 (Columbus, Ohio), pp. 280–281, Abstract 2008282a & JP A6011239 (Nippon Telegraph & Telephone Public Corp.) 21 Jan. 1985.

*Primary Examiner*—W. Gary Jones
*Assistant Examiner*—John Hoffmann
*Attorney, Agent, or Firm*—Nixon & Vanderhye

[57] ABSTRACT

Halide glass articles, e.g. rods, tubes and preforms for making fluoride glass fibres, are prepared by melting and/or casting the articles under a low pressure, e.g. 0.01 to 500 mbars and, during the low pressure regime, a gas flow rate of between 0.01 to 100 liters/min (measured at NTP) is maintained. It has been found that subjecting the melts to a low pressure reduces the attenuation of the fibre which eventually results from the melts.

8 Claims, 2 Drawing Sheets

METHOD OF MAKING HALIDE FIBERS INCLUDING CASTING UNDER A REDUCED PRESSURE

CROSS-REFERENCE RELATED APPLICATION

This is a divisional of application Ser. No. 07/983,854, filed Mar. 4, 1993, U.S. Pat. No. 5,334,222.

BACKGROUND OF THE INVENTION

1. Field of the Invention

This invention relates to a method for the preparation of halide, preferably fluoride, glass articles, e.g., preforms suitable for drawing into fibre.

2. Related Art

Halide, and especially fluoride, glass fibre is used where transmission in the wavelength band 2000 nm to 4500 nm is required. Halide fibres also display good transmission outside this band, e.g., over the range 500 nm to 2000 nm but competitors, e.g., $SiO_2$ based fibres, have good transmission in this region. However, the competitors have such high attenuations in the band 2000 nm to 4500 nm that they are excluded for consideration when it is required to use the fibre at this wavelength.

In most cases, the preparation of halide fibres involves first the preparation of the core and clad glasses, the casting of these two glasses to make a preform and the drawing of the preform into fibre. It is important to avoid contamination during the preparation of the glasses and their casting. For this reason it is usual to carry out these stages in isolation chambers which are provided with a dry inert atmosphere at slightly above the pressure outside the isolation chamber. The inert atmosphere is usually nitrogen for reason of cheapness but other inert gases, e.g., argon or helium, could also be used. It is also advantageous to submit the melt to an oxidation process and mixtures of inert gas and oxygen are used for this purpose. The transmission properties of a halide fibre are determined to a large extent by chemical considerations, e.g., the chemical composition of the core glass and the clad glass. It is also important that the two glass compositions cooperate to provide guidance and are compatible with one another during the preparative stages, especially the drawing.

The selection of the chemical compositions of the core and clad glasses together with the careful preparative techniques indicated above are important to achieve low attenuation but it appears that mechanical imperfections, e.g., crystals and bubbles, in the fibre can also cause attenuation, probably because mechanical imperfections can scatter the light.

SUMMARY OF THE INVENTION

This invention is based upon the discovery that mechanical imperfections can be caused during the preparation of the glasses and in the casting of the preform and it has most surprisingly been discovered that subjecting the melts to treatment under the atmospheric conditions specified below, substantially reduces the incidence of mechanical faults whereby fibre with lower attenuation is achieved. It will be appreciated that subjecting solid glass to the specified treatment will have little or no effect upon its properties and it is the molten glasses which benefit from said treatment applied during the latter stages of their preparation and/or during casting. The melting of the halide glasses is carried out in contact with atmospheres, especially controlled atmospheres, which are conveniently provided in a chamber attached to an apparatus such as a glove box. The term "controlled atmosphere" includes inert atmosphere consisting of inert gases such as nitrogen, helium and argon. At certain stages of the process the controlled atmosphere may be pure oxygen or oxygen mixed with an inert gas. The atmospheric conditions mentioned above comprise a flow of gas at low pressure through the atmosphere which is in contact with the melt. Said flow of gas is preferably at a flow rate of 0.1 to 100 liters/minute, e.g., 2 liters/minute as measured at NTP (normal temperature and pressure). These correspond to ranges of $7 \times 10^{-6}$ to $7 \times 10^{-3}$ moles/second and $1.5 \times 10^{-4}$ moles/second respectively. Said low pressure is preferably below 500 mbars (millibars), especially below 150 mbars (millibars), e.g., within the range 5 to 150 mbars.

The invention is further defined in the claims.

During the casting of preforms, it is desirable that the pouring of the core is carried out at a lower temperature and pressure than the pouring of the cladding, e.g., 20°-200° C. lower than the pouring of the cladding. The cladding is preferably poured at a pressure of below 500 mbars, e.g., at a temperature at which is viscosity is 0.01 to 1000 poise and under a pressure of 2-100 mbars. The preferred pressure for the core is 0.01-2 mbars. It has been observed that these conditions also give good results even without the flow rates mentioned above.

The halide glasses mentioned above comprise (and preferably consist of) mixtures of metal halides wherein at least 90 mole %, and preferably 100 mole % of the halide is fluoride. In the case where the percentage of fluoride is less than 100%, it is preferred that the balance of the halide is entirely chloride. Of the metals which constitute the halides preferably at least 45 mole % is Zr and at least 10 mole % is Ba. It is preferred that metals in addition to Zr and Ba are also present and these are conveniently selected from Al, La, Na, Hf and Pb. The glass composition may also include dopants, e.g., rare earth metals such as Nd and/or Er to confer lasting properties on the glass. These dopants are conveniently present in the form of halides, especially fluorides.

The invention relates particularly to the preparation of halide (as defined above) fibres, and especially fibres which are produced by drawing preforms with a core/-cladding structure. The preforms may be made by casting a tube of a first halide glass, and, before the tube cools, casting a second halide glass into its bore. Alternatively, a preform may be assembled by casting tubes and rods, and shrinking the tubes onto the rods.

In addition, tubes may be shrunk onto preforms as described above. This is convenient for making preforms with more than 2 regions, e.g., using more than 2 different glass compositions and for making preforms with large cross sectional areas. It is also convenient to shrink tubes onto preforms when it is desired to make fibre with small cores. This usually implies a fibre in which the cross-sectional area of the cladding is large in relation to the cross-sectional area of the core. The conventional method, in which the core is cast into a tube of cladding, is mechanically difficult because of the small diameter of the tube. This difficulty can be avoided by casting a preform in which the size of the core precursor is convenient for casting. Stretching the preform so that its diameter is reduced about 2-20 times, reduces the size of the core but the preform no longer has an adequate diameter. Therefore shrinking a tube of cladding glass onto the reduced preform restores the external dimension.

The glasses which are used for casting the articles previously identified, i.e., tubes, rods and preforms, may be prepared by melting together the appropriate fluorides or by fluorination of the appropriate oxides. These preparative methods are described in greater detail below. In addition the melts needed to cast the articles may be prepared by melting previously formed glass compositions. In any case, however, the glass melt is prepared, the low pressure treatment specified above is applied either to the melt immediately before casting, or to the melt during casting, or during both stages.

BRIEF DESCRIPTION OF THE DRAWINGS

The invention will now be described by way of example with reference to the accompanying drawings in which.

DETAILED DESCRIPTION OF EXEMPLARY EMBODIMENTS

Figure 1:
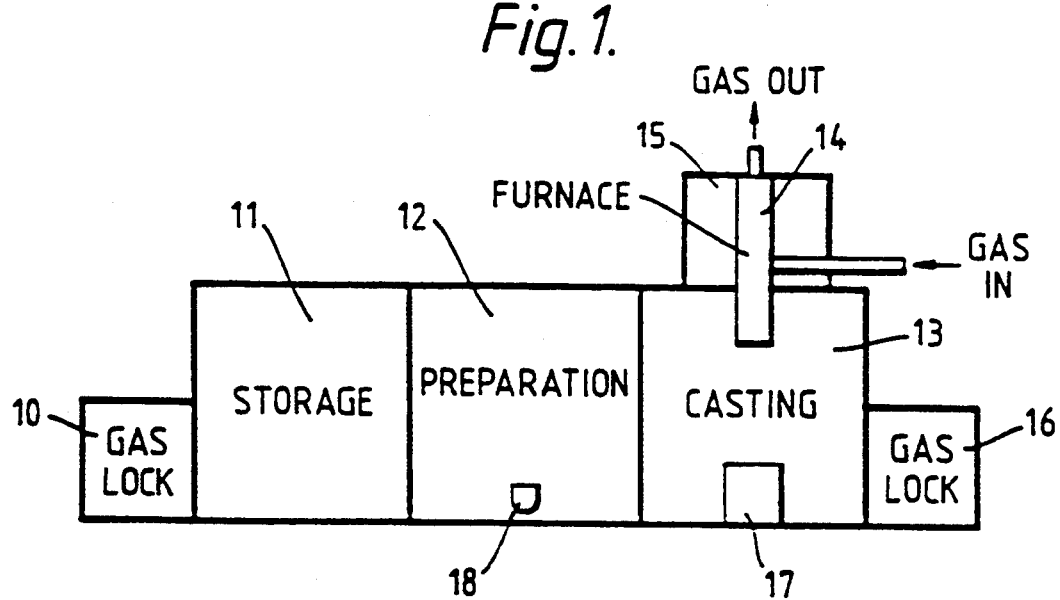
FIG. 1 is a diagram illustrating isolation chambers suitable for the preparation of fibre preforms.

The isolation chambers shown in FIG. 1 comprise a gas lock 10 for introducing chemicals, crucibles and other equipment into the inert atmosphere. The gas lock 10 provides easy access to a storage chamber 11 in which materials and equipment can be retained until required. The storage chamber 11 gives access to a preparation chamber 12 via a hatch (not shown). Crucibles 18 can be placed in the preparation chamber and charges to make desired glass compositions are weighed into a crucible. (Where it is appropriate to distinguish, 18B will be used to denote a crucible used for cladding glass and 18A to denote a crucible used for core glass).

Figure 2:
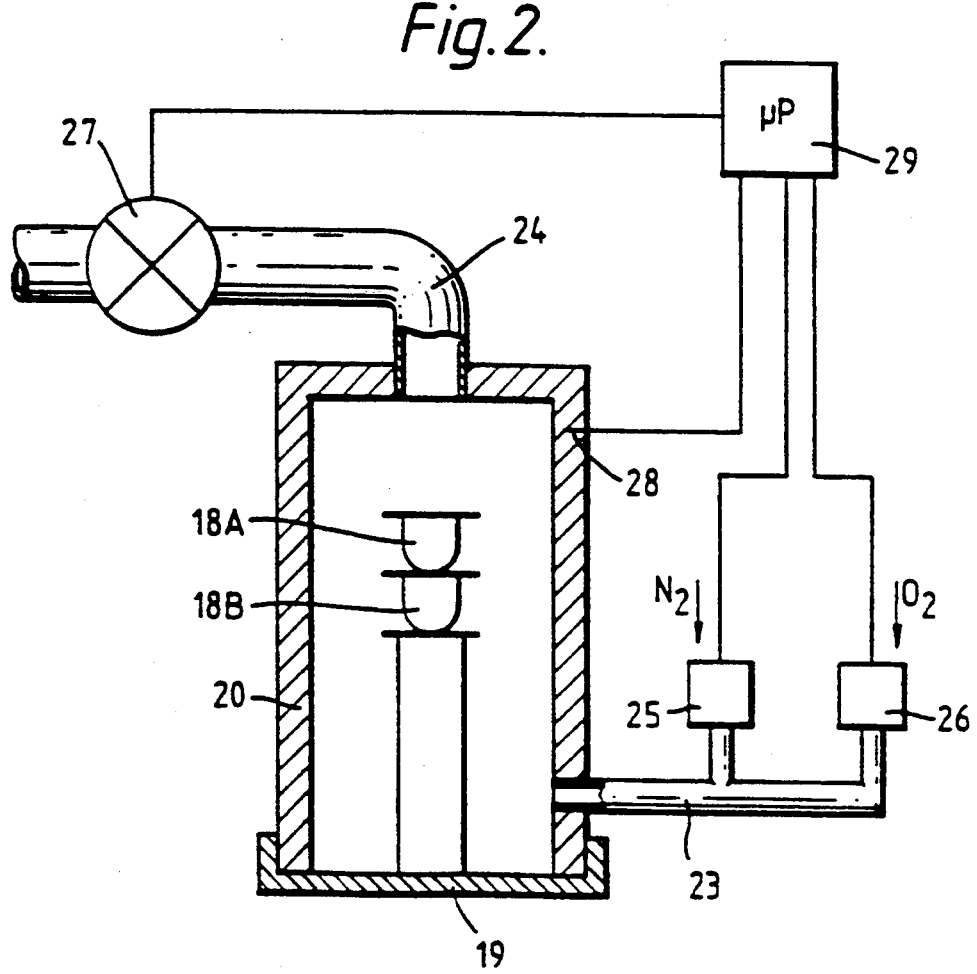
FIG. 2 is a diagrammatic illustration of a furnace suitable for melting halide glasses in accordance with the invention.
Figure 3:
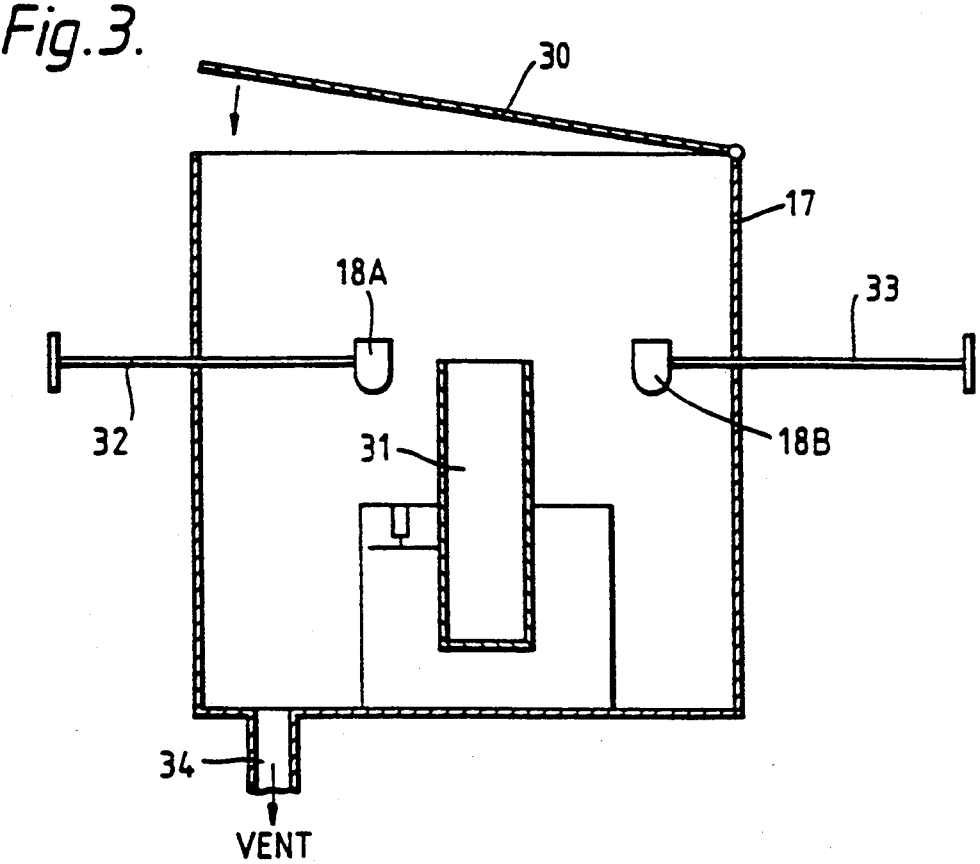
FIG. 3 is an illustration of a moulding box suitable for making preforms in accordance with the invention.

The preparation chamber 12 gives direct access, via a hatch (not shown), to the casting chamber 13. A furnace 14 is located vertically above the casting chamber 13. Said furnace is located in a furnace chamber 15 and its lower end extends into the casting chamber 13 for ease of access. The casting chamber 13 contains a moulding box 17 and it is provided with a gas lock 16 which is used to take fibre preforms out of the isolation chambers. The furnace 14 is shown in greater detail in FIG. 2 and the moulding box 17 is shown in greater detail in FIG. 3.

All the gas locks and chambers shown in FIG. 1 are provided with a supply of nitrogen (not shown) and with vents to allow used nitrogen to go to waste. The chambers are permanently flushed with dry nitrogen (less than 10 ppm of water) which is maintained at a pressure slightly higher than the external so as to reduce the risk of contamination entering the isolation chambers.

The isolation chambers shown in FIG. 1 make it possible for chemicals and other materials to be stored permanently in a dry atmosphere so that the risk of contamination is substantially reduced. In addition, all blending, melting and casting operations are carried out under a pure, dry atmosphere so that the risk of introducing impurities during handling is substantially reduced. Each chamber has its own separate supply for the dry atmosphere and hatches are normally closed between the chambers. Thus the risk of cross-contamination between the chambers is substantially reduced. It has been found that these precautions are necessary because even slight contamination can substantially increase the attenuation of fluoride glass fibres.

When crucibles 18 have been charged in the preparation chamber 12 (and lids applied to reduce the risk of contamination), they are transferred to the casting chamber 13 and introduced into the furnace 14. The ingredients are melted in the furnace 14 and the crucibles 18, complete with hot, molten charges are returned to the casting chamber 13. When the preforms have solidified and cooled, they are removed via the gas lock 16 for drawing to fibre.

It should be noted that crucibles are usually processed in pairs, i.e., one crucible 18A for the core glass and the other crucible 18B for the clad glass. More details of processing will be given below.

There are two basic processes for the preparation of fluoride glasses and the two processes will be described briefly. The isolation chambers shown in FIG. 1 are suitable for both processes.

According to the first process oxides of the selected metals are weighed in the preparation chamber 12 and mixed thoroughly in a crucible. In addition to the oxide powders ammonium bifluoride, $NH_4F_2HF_2$ is introduced into the crucible. In the furnace 14 the ammonium bifluoride decomposes and converts the oxide to fluorides.

In the alternative process the selected fluorides are weighed and mixed in the crucible. With this process it is not always necessary to use the ammonium bifluoride because no chemical reaction is intended. However, as a precautionary measure, it is common to introduce a small amount of ammonium bifluoride into the crucible in case the fluoride powders are contaminated by oxides.

It should be realized that hydroxide and oxide are the two most obnoxious contaminants in fluoride fibres and, therefore, it is important to reduce the level of these contaminants to the minimum.

The furnace, shown as 14 in FIG. 1, comprises a body 20 which includes insulation and electric heating elements. The body has an inlet port 23 situated near the bottom and a vent 24 at the top.

The inlet port 23 is connected to a nitrogen mass flow valve 25 and an oxygen mass flow valve 26. These valves are adjustable during melting operation to provide a controlled and variable atmosphere during processing. The vent 24 is connected to a controllable exhaust pump 27 so that the pressure in the furnace can be varied. In addition, the furnace is provided with a thermometer 28 for measuring the temperature of operation.

For the convenience of the operatives the system includes a microprocessor 29 which is operatively connected to:

the nitrogen mass flow valve 25,
the oxygen mass flow valve 26,
the exhaust pump 27,
the thermometer 28, and
the electric supply to the furnace.

The microprocessor 29 includes a timing means as well as a storage facility for storing programs to operate the furnace for production runs which programs include data defining an operational sequence. Thus the microprocessor 29 provides automatic means for performing complicated production schedules without the detailed attention of the operators. The microprocessor 29 can be programmed to emit a signal to attract the attention of operators when a production schedule has been completed.

During a melting schedule, the base of the furnace is closed by means of a closure plate 19 which seals the furnace to prevent the contamination of the furnace chamber 15 by gases evolved during heating. It is convenient to support the crucibles 18A and 18B by means of the closure plate 19.

Before a melting operation crucibles 18A and 18B, at this stage containing the precursors of the glasses in the form of mixed powders, are introduced into the furnace and the closure plate 19 is applied to seal the furnace. (If it is intended to apply identical melt schedules to both crucibles then it is convenient for both crucibles to go into the same furnace. If different melt schedules are intended it is necessary to use two furnaces.)

At this stage a supply of nitrogen, at ambient pressure, is passed through the furnace or fu maces. A typical melt schedule is as follows:

(1) In a controlled atmosphere, the crucibles 18A and 18B are raised to the temperature at which any $NH_4F_2HF_2$ reacts. This temperature is usually in the range 200° to 500° C.

(2) The crucibles are maintained at this temperature for a period of 30 to 90 mins to allow completion of any reactions which occur. A stream of gas removes any vapours which are evolved during this stage.

(3) The temperature in the furnace is raised, e.g., to 700° to 900° C., to ensure that all the components have passed into solution. This stage is conveniently carried out under the ambient pressure in the isolation chambers.

(4) The melts are oxidised for 10 to 150 minutes. Oxygen, preferably in the form of blends containing $O_2$ and inert gas in the mole ratios 1:0 to 1:100, was used as the oxidising agent.

(5) When the temperature of the glass has reduced by at least 50° C. the setting on the nitrogen flow valve 25 is reduced to zero whilst continuing with the flow of oxygen and the exhaust pump 27 started. This reduces the pressure in the furnace to about 50 mbar. This has the effect that the last stage of the melting is carried out under reduced pressure in accordance with the invention. The atmosphere may be pure $O_2$ at this stage. The temperature should be at least 600° C.

(6) The supply of nitrogen is re-started and the supply of oxygen is terminated. When the oxygen is clear of the furnace the closure plate 19 is removed and the crucibles are transferred into the casting chamber 13.

The structure and use of the casting box 17 will now be described.

The oxygen treatment, i.e., step (4), is described in our patent portfolio consisting of EP 170380, U.S. Pat. Nos. 4,741,752, 4,848,997 and CD 1267537.

After removal from the furnace 14 the hot crucibles 18A and 18B, containing molten glass, are placed in the casting box 17 for the formation of the preform.

The casting box 17 has a lid 30 which opens to allow the entry of the crucibles 18A and 18B. When the lid 30 is closed the pressure in the box 17 can be reduced. The box 17 contains a conventional mould for the centrifugal casting of tubes. This comprises a tubular mould 31 which can be rotated about its longitudinal axes to provide the centrifugal force for casting and which can be tilted between the horizontal and the vertical. Since this is a conventional arrangement for the centrifugal casting of tubes, it will not be described in detail. The box 17 also contains manipulators 32 and 33 and it also has a vent 34 for connection to suction to reduce the pressure.

After melting in the furnace, the hot crucibles 18A and 18B are transferred into the holders 32 and 33 and the lid 30 is closed. At this stage suction can be applied to the vent 34 so that the pressure in the box 17 is reduced. Preferably the box 17 is not completely sealed since it is desired to cause a constant flow of nitrogen through the box during the casting process. Suitable flow rates are 0.01 to 100 liters/min, preferably 0.1 to 10 liters/min, (as measured at NTP). The pressure in the box and the temperature of the glass vary during the casting process. These variations will be briefly described.

Initially the pressure is reduced below 500 mbars, preferably below 150 mbars, preferably to a pressure of 2–100 mbars. Under a pressure within this range the manipulator 33 is used to pour the cladding glass into the mould 31 and, when it is poured, the viscosity of the cladding glass is preferably 0.1 to 1000 poise. (This often requires a temperature in the range of 450°–600° for lasers with more than 50 mole % $ZrF_4$). After pouring, the mould is rotated about its longitudinal axis and this causes the molten glass to be distributed evenly around the mould 31 so that a tube is formed. At this stage the temperature must be high enough so that the glass is sufficiently mobile to form a good tube but the high temperature makes it desirable to maintain the pressure above a minimum determined by the temperature of the glass. This avoids vapourisation of volatile components which could re-condense and contaminate the preform. Even trivial amounts of re-condensation can cause substantial defects by nucleating crystal growth. Thus at temperatures close to 500° C. it would be undesirable to use pressures substantially below 100 mbars. Because of the chilling caused by the mould 31 the cladding glass is cooled and it solidifies. The core glass in the crucible 18A cools, but not as quickly as the cladding glass in the mould 31, so that the core glass remains mobile. When the cladding glass is sufficiently solidified the rotation is terminated and the longitudinal axis of the mould is tilted back to the verticle orientation. At this point the manipulator 32 is used to pour the core glass from the crucible 18A into the bore of the tube which has just been formed. This operation is performed at a temperature which is lower than the temperature at which the cladding glass was poured, e.g., at a temperature which is 20°–200° C. lower. It will be appreciated that the lower temperature means that the core glass will have a substantially higher viscosity than the cladding glass during pouring but it has been found that this still allows good casting of the core to be achieved. At these lower temperatures, the pressure in the system can be further reduced so that the core glass is cast at a pressure below that at which the cladding glass was cast. Conveniently the core glass is east under pressure of 0.01 to 2 mbars. The casting of the core completes the casting operation and the preform is allowed to cool under a reduced pressure.

When the preform has cooled enough to be handled, the suction at vent 34 is terminated, the pressure in the box 17 allowed to return to the ambient pressure in the casting chamber 13, and the preform is annealed in the mould. When it has cooled the mould 31, containing the solid preform, is now removed from the isolation chambers via the gas lock 16.

The preform, which has been prepared in accordance with the invention because the last stages of the melting and the casting were carried out under reduced pressure, is convened into fibre using conventional techniques. The preform may be drawn in the form in which it was cast but improved fibre performance may be obtained by the use of one or more of the following features.

Polishing

Poor surface quality can sometimes impair the strength of fibre and increase the loss. Therefore, it may be desired to polish the surface of the preform preliminary to drawing. The polishing may be carried out mechanically using abrasives.

Etching

Gentle chemical etching, e.g., using a solution of $ZrOCl_2$ to remove surface layers which may be contaminated. Etching is often appropriate to remove abrasives which have been used in a previous polishing stage.

Ion Bombardment

It has been found that placing the preform in a vacuum chamber and bombarding it with suitable ions can remove a very thin surface layer. This is valuable where contamination is limited to very thin surface layers and the use of a vacuum reduces the risk of recontamination.

Protective Coating

As a final treatment before drawing, it is often convenient to apply a protective coating to the surface of the preform. Chalcogenide glasses have been recognised as a particularly suitable form of coating because they form barrier layers to protect the fluoride fibre from a hostile environment. Very thin layers of chalcogenide glass can be applied by ion beam sputtering in the same vacuum chamber which is used for bombardment. This allows at least a preliminary coating to be applied to the preform while it is still under vacuum and before exposure to the air allows recontamination.

(One form of ion bombardment and coating are described in our patents EP 266889 and U.S. Pat. No. 4,863,237).

Finally, using conventional techniques, the preform is drawn so that its diameter is reduced in the ratio (20–220):1, e.g., 80:1, so as to produce the fibre which is the ultimate product of the invention. It has been demonstrated that the use of low pressures as described above can reduce the attenuation of the fibre by a factor of about 10. It can also improve the mechanical strength of the resulting fibres.

Three fluoride glass fibres were prepared by three different methods. Each of the fibres had the composition specified in the following table.

| Component | Core Glass | Cladding Glass |
|---|---|---|
| $ZrF_4$ | 58.6 | 62.1 |
| $BaF_2$ | 23.2 | 24.6 |
| $LaF_3$ | 7.1 | 5.6 |
| $AlF_3$ | 1.9 | 1.8 |
| NaF | 5.1 | 5.9 |
| $PbF_2$ | 4.1 | 0 | wherein the numbers represent percentage by weight.

A more detailed description of these fibres is given in our patents EP 170380 and U.S. Pat. No. 4,836,643.

Fibre A was prepared by the preferred embodiment of the invention using a low pressure treatment during both melting and casting.

Fibre B was also prepared according to the invention but using the low pressure treatment during melting only.

Fibre X was prepared according to the prior art without any low pressure treatment.

Figure 4:
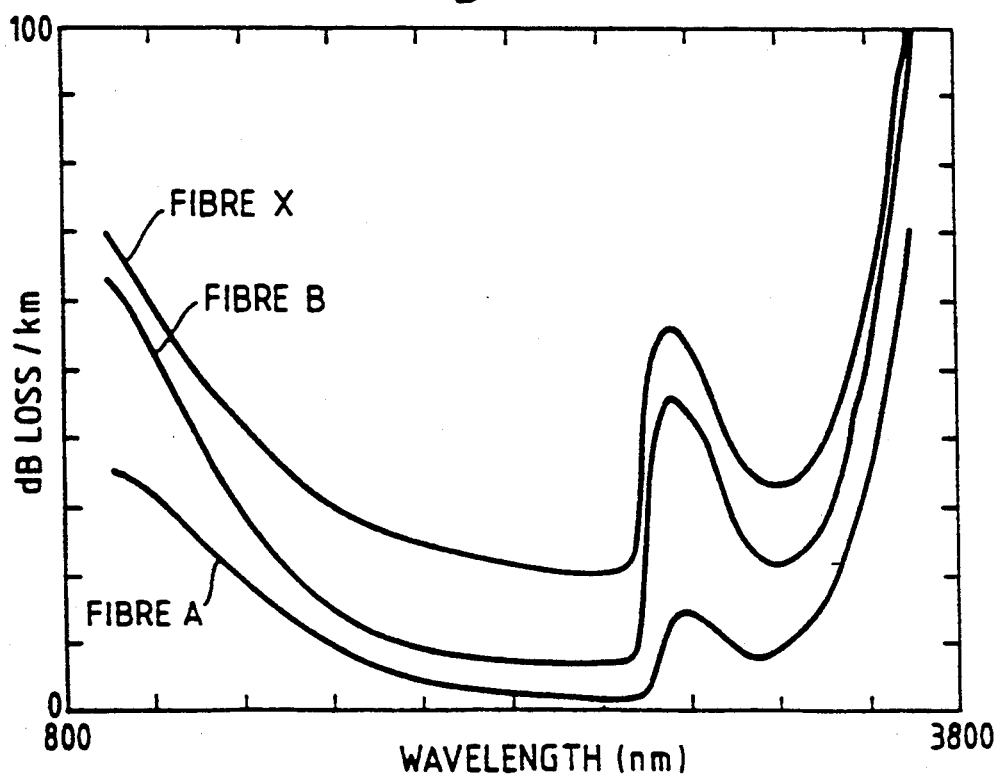
FIG. 4 is attenuation curves comparing fibres prepared by different techniques.

FIG. 4 shows the attenuation for all three fibres and it is easy to see that the low pressure treatment according to the invention substantially reduces the attenuation.

The minimum attenuation is at about 2700 nm in each case and the attenuations are:
Fibre A 1.5 dB/km
Fibre B 6.5 dB/km
Fibre X 20.5 dB/km.

As should be apparent from the use of absolute SI units throughout the specification and claims, all pressures are stated in absolute units rather than gauge units.

It is claimed:

1. A method of preparing a halide glass wherein at least 90% mole of the halide of said halide glass is fluoride, which method comprises:
  (i) heating precursors of a halide glass until evolution of gas therefrom has substantially ceased;
  (ii) raising the temperature of the precursors and heating them at ambient pressure to ensure that all the precursors are melted and have passed into solution with each other; and
  (iii) reducing the temperature of the glass by at least 50 degrees C. and then substantially reducing the pressure to thereby form the halide glass.

2. A method of preparing a halide glass fibre which method comprises:
  casting a cladding precursor melt as a tube into a mould at a first pressure less than atmospheric pressure and thereafter casting a core precursor melt into the bore of said tube to thereby form a preform,
  the casting of said core precursor melt into said bore being done under a second pressure which is lower than said first pressure,
  the casting of said core precursor melt being done while at a second temperature which is lower than a first temperature at which the cladding precursor melt was cast, and
  drawing said preform into a fibre.

3. A method according to claim 2 in which the first pressure is below 500 millibars.

4. A method according to claim 2 in which the second temperature which is 20°–200° C. lower than the first temperature.

5. A method according to claim 4 wherein the casting of said cladding precursor melt is done at which its viscosity is 0.01 to 1000 poise and said first pressure is 2–100 millibars.

6. A method according to claim 4 wherein said second pressure is 0.01 to 1 millibars.

7. A method according to claim 2 wherein all of the halide of said halide glass melt is fluoride.

8. A method of preparing a fluoride glass fibre which fibre comprises a core of a second fluoride glass surrounded by and in contact with a cladding of a first fluoride glass wherein the refractive index of the second fluoride glass is higher than the refractive index of the first fluoride glass, which method comprises:

(a) providing precursors of a first fluoride glass into a first crucible, (b) providing precursors of a second fluoride glass into a second crucible, (c) transferring each of said crucibles into a furnace and subjecting both crucibles simultaneously to a melting regime comprising, in the order specified, (c1) pre-heating said crucibles in the presence of a dry gas at ambient pressure until any evolution of gas evolved from the glass precursors substantially ceases, (c2) heating said crucibles to a temperature above the melting point of the glasses in the presence of a mixture of oxygen and inert gas in a mole ratio of from 1:0 to 1:100, (c3) reducing the temperature by at least 50° C. but not a temperature below 600° C. while maintaining a pressure in the range 5–150 millibars in said furnace, (d) transferring the crucibles to a casting zone, and (d1) casting said first fluoride glass as a tube wherein said casting includes pouring the melted precursors of said first fluoride glass into a mould at a temperature at which its viscosity is 0.01 to 1000 poise under a pressure of 2–100 millibars, (d2) casting said second fluoride glass into the bore of said tube whereby a fibre preform is produced, wherein the pouring of the melted precursors of said first fluoride glass into bore is carried out at a temperature which is at least 20° C. lower than the temperature used in step (d1) and under a pressure in the range of 0.01–2 millibars, and (e) drawing the fibre preform into the fibre.

* * * * *